United States Patent Office 3,535,598
Patented Oct. 20, 1970

3,535,598
SOLID STATE TUNNEL CATHODE EMITTER HAVING AN IMPROVED THIN FILM INSULATING BARRIER
Wolfgang M. Feist, Burlington, Mass., assignor to Raytheon Company, Lexington, Mass., a corporation of Delaware
Continuation-in-part of application Ser. No. 646,659, June 16, 1967. This application May 23, 1969, Ser. No. 827,296
Int. Cl. H01l 3/10
U.S. Cl. 317—234
7 Claims

ABSTRACT OF THE DISCLOSURE

A tunnel cathode emitter having two conductive layers separated by a thin film insulating tunneling barrier layer of preferably boron nitride which may be deposited by such processes as chemical vapor deposition or radio frequency sputtering. The insulating layer material is chemically inert with respect to the adjacent conductive layers and its refractory qualities permit a wider selection of materials. The electron work function of the top thin film layer relative to the base conductive member will differ by a predetermined value to assure tunneling of the electrons substantially entirely within the forbidden energy band between the two conductive materials before emission into the adjacent vacuum environment.

CROSS-REFERENCE TO RELATED APPLICATIONS

This application is a continuation-in-part of co-pending application Ser. No. 646,659, filed June 16, 1967 and assigned to the assignee of the present invention.

BACKGROUND OF THE INVENTION

Nonthermionic solid state electron emitters utilizing quantum mechanical tunneling through metal-insulator-metal sandwich configurations have been disclosed in the art. Such devices incorporate a thin film insulating barrier layer disposed between a first conductive member or negatively biased base member of a metallic or semiconductive material and a second conductive member or positively biased electrode in the form of a thin metallic layer. According to the prior art, devices having the most favorable characteristics commonly utilize aluminum or beryllium as the base metal and oxides of said metals as the barrier layer. These insulating coatings are formed by a chemical reaction in which the base metal material serves as a constituent of the combined reaction product. The top film layer is selected from a group of suitable conductive metals such as aluminum, gold and platinum with a relatively thin thickness to permit the high energy electrons injected from the base member by quantum mechanical tunneling to penetrate the top surface layer without loss of appreciable energy. The emission of electrons is achieved by the quantum mechanical tunneling phenomenon upon the establishment of a sufficiently large electric potential between the conductive body members.

Serious operating life and stability problems associated with prior art emitters have precluded their exploitation in electron discharge devices. One principal reason for the instability is the high electric field strengths required to produce the tunneling current through the barrier insulating layer. Such high electric fields of the order of $10^7$ volts/cm. cause rapid breakdown of the oxide layers which in the prior art were grown by thermal oxidation or anodization of the conductive base member material and are essentially amorphous. Under the influence of the electrical stresses the essentially amorphous oxide layer may develop crystalline grains with associated cracks and grain boundaries in which conducting areas form. These imperfections become responsible for excessive leakage currents which are not useful for the emission process.

In particular, the high electric fields associated with the operation cause destruction of the insulator layer by a combination of processes including:

(1) the heat generated by leakage currents through the imperfections or cracks developed in the oxide type insulating material;
(2) heat generation due to losses suffered by the hot or energetic electrons passing through the emitter;
(3) field and temperature induced changes in the crystal structure of the insulator;
(4) field and temperature induced migration of the electrode materials into the insulator or their chemical reaction with the insulator; and
(5) field and temperature induced changes by ion migration of the insulator constituents.

The provision of an improved insulator barrier material by thin film techniques utilizing materials having improved stable crystalline structure of a refractory as well as chemically inert nature is therefore highly desirable in the fabrication of tuned cathode emitters. In addition, with appropriate materials selected on the basis of their electron work function, operation at reduced electric field strengths provides for extended life of such devices.

SUMMARY OF THE INVENTION

In accordance with the teachings of the present invention a tunnel cathode emitter is provided with a thin film insulating barrier layer of a material selected for its predominantly covalent bonding nature as well as its chemical inertness with respect to the metal electrodes. In addition, the insulating layer is formed independent of the base member material by chemical vapor deposition or radio frequency sputtering. Boron nitride is selected as the insulating layer material due to its highly inert electrical, chemical and structural characteristics. Additionally, the stable material formed in accordance with this invention enables the selective establishment of suitable energy barriers leading to the substantial avoidance of electron scattering in the insulator layer and the top metallic layer which reduces the efficient generation of high energy level electrons. The thickness of the thin film insulating layer formed by the vapor deposition method may be accurately controlled to desirably yield a sufficiently large tunneling current at the minimum voltage which must be applied across the emitter in order to produce emission of electrons into a vacuum environment. The application of the boron nitride insulating material by the deposition technique or other suitable methods had yielded tunnel cathode emitters providing operating lives several orders of magnitude longer than was possible with previously used oxide type insulating layer structures. Due to the chemical inertness of the boron nitride with respect to the base material numerous metallic substrates are now available for use and may be selected on the basis of refractory qualities, work function and structural stability. Such materials include zirconium, magnesium, thorium, titanium, ruthenium and gold, many of which have been heretofore unsatisfactory or have been not applicable when employed with the oxide type insulating layer structures. Further improvement in the operating life is possible through the reduction of the operating field strengths across the insulator layer by taking advantage of a compensating field which is established due to the difference in the electron work functions of the conductive materials.

BRIEF DESCRIPTION OF THE DRAWINGS

The invention, as well as the details of the construction of a preferred embodiment, will be readily understood after consideration of the following detailed description and reference to the accompanying drawings, in which.

DESCRIPTION OF THE PREFERRED EMBODIMENT

Figure 1:
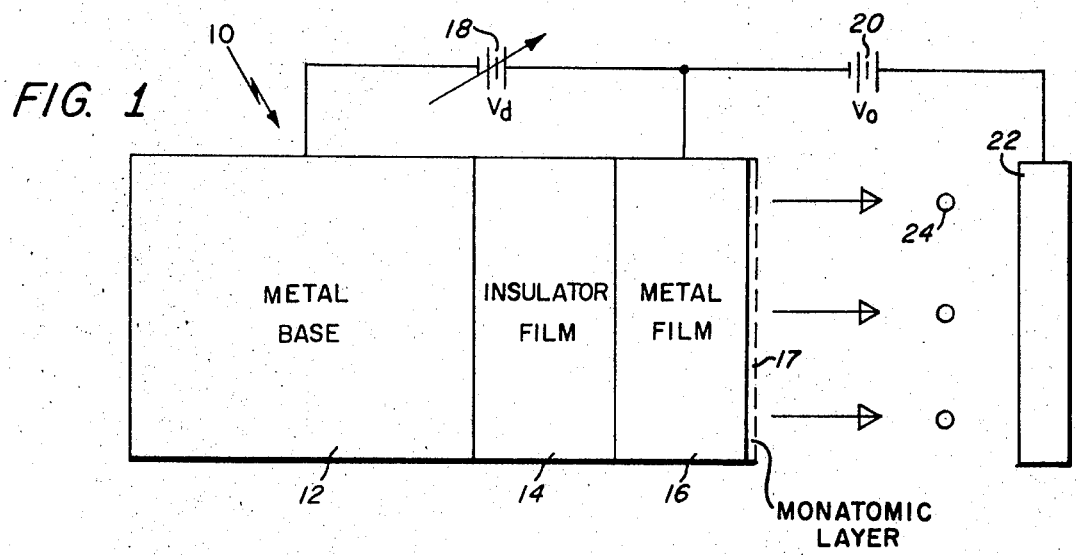
FIG. 1 is a diagrammatic representation of the embodiment of the invention.

Referring to FIG. 1, the tunnel cathode emitter 10 of the nonthermionic type comprises a first conductive layer such as a metal base member 12 providing the source of electrons and a barrier layer of an insulating material 14 in intimate contact with one planar surface of the base member. A top or second conductive layer 16, desirably of very thin dimension, is joined to the insulator barrier. In addition, an essentially monatomic layer 17 of a suitable material further reduces the electron work function of the outer surface of the top metal layer. The insulator and top film layer thickness are each preferably of the order of 200 angstroms or less. This thin dimension of the insulating layer distinguishes such devices from other forms of cold cathode emitters having much thicker insulating material layers of many hundred angstroms. In such devices, avalanching, Schottky barrier emission and emission from traps are the principal processes for electron emission. In contradistinction, therefore, the devices presently under consideration involve the migration of electrons through the interior of the solid state material by quantum mechanical tunneling.

A variable electrical potential $V_d$ is applied across the device by a suitable voltage source 18 with the top metallic film layer 16 positively biased with respect to the base member 12 to initiate tunneling of electrons. A second voltage source 20 to provide an electrical potential $V_o$ is connected between the top metallic film layer 16 and an anode 22 collecting the emitted electrons. Ideally, the electrons traversing the emitter do not lose their energy in the process and arrive in the top metal film layer with an excess energy equal to the applied voltage $V_d$ multiplied by the charge of the electron. The electrons 24 which traverse the thin top metal film layer are emitted into the adjacent medium which in the case of the cathode is a vacuum and such electrons are hereinafter referred to as hot or energetic electrons. Electrons that are intercepted because of the energy losses that occur in practice are conducted away to the battery.

Embodiments of the prior art include structures of a metal base member-metal oxide-metal film type. In a typical assembly a metallic material such as aluminum is deposited on a substrate of a material such as glass or fused silica and the aluminum is oxidized to form the tunneling insulator layer of the preferred thickness. The oxidation is performed by various wet or dry methods to result in anodic, thermal, or plasma oxidation of the base metal. Thus, the insulator layer is formed by subjecting the base metal element to an oxidizing reaction. The top film layer is then deposited by evaporation in a high vacuum. Gold is commonly preferred as the top film layer in view of its high conductivity and favorable transparency to hot electrons.

The deficiencies in the insulator layers formed by the anodic oxidation method are believed to be influenced by water constituents introduced into the insulator layer. Although many metal oxides are generally considered to be good insulators, they have not met the requirements as stable tunneling insulator materials under the electric field strengths of the order of $10^7$ volts per centimeter which is the usual electric field applied. Practical tunneling devices, therefore, are difficult to achieve. The problem of stability is aggravated by elastic and inelastic scattering of electrons passing through the insulator which results in excessive heating of the emitter. Additionally, ionic migration and metal diffusion through the insulator has been determined by many experimenters to be a major contributing factor to the unstable behavior as well as low emission current density of prior art tunnel cathode emitters.

Figure 2:
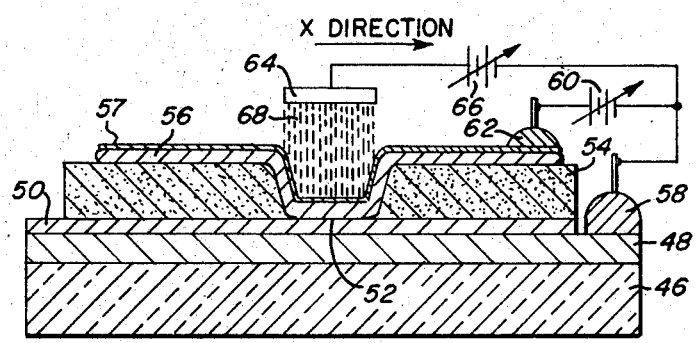
FIG. 2 is a detailed cross-sectional view of an illustrative embodiment of the present invention.

Referring now to FIG. 2, the improved device in accordance with the teachings of the present invention as well as the method of fabrication will now be described. A thoroughly cleaned substrate 46 of a material such as alumina, fused silica or other high temperature materials is processed by ion bombardment, and a subsequent bakeout to over 400° C. in an ultrahigh vacuum ($\approx 10^{-6}$ torr). A base layer 48 of a conductive metal is then deposited by evaporation on the substrate to a desired thickness which might illustratively be many hundreds angstroms. Alternatively, a well polished semiconductive substrate, for example N-type silicon, or a polished metal substrate may be employed, preferably one of high thermal conductivity.

In accordance with the present invention the tunneling insulating layer 50 is fabricated from boron nitride having a thickness of approximately 200 angstroms or less in thickness. Preferably, for optimum electrical characteristics the thickness of the insulating layer should be made sufficiently thin so that the distance over which tunneled electrons have to travel in the conduction band of the insulator is comparable with or smaller than the mean free path for scattering. The boron nitride material exhibits excellent refractory and dielectric properties and is highly chemically inert. The nature of the chemical bonding of the insulator material is covalent and the difficulties in prior art insulating layer materials arising from ionic migration are thereby considerably reduced. The boron nitride film can be produced to provide a highly ordered and stable crystalline structure. On particular metal base materials such as gold on a quartz substrate an anisotropic or highly oriented film has been observed. On other materials such as platinum or tungsten an isotropic crystalline structure was observed. The chemical inertness of boron nitride permits the deposition of the insulating layer on many base materials without creating any undesirable interfaces. In addition, the refractory quality of the boron nitride material facilitates a broader latitude in the selection and method of formation of the top film layer material. The permitted selection of the conductive layer materials is in keeping with an additional feature of the invention in the provision of a suitable electron work function differential to permit the tunneling of the electrons substantially entirely within the forbidden band of the insulator layer. Furthermore, with the improved material selectivity it is possible to operate at reduced electric field strengths prevailing across the insulator material and thereby further prolong the life of the tunnel emitter. In actual embodiments operational life has been measured at values of at least three orders of magnitude longer than conventional oxide type insulating film layers.

The deposition of the boron nitride film 50 on the metal base member may be illustratively accomplished through the use of $BCl_3$ or some other suitable volatile boron compound and ammonia $NH_3$ gas fed into a reaction chamber which is pumped with a relatively high speed to maintain a pressure range in the order of $20 \times 10^{-3}$ to $10^{-2}$ torr to avoid volume reaction of the gases and deposition of agglomerates on the substrate body. A temperature of 800° to 900° C. or higher is maintained throughout the process of the boron nitride film formed on the metal base resembles white graphite.

The method described is generically referred to as the chemical vapor deposition method and the thickness of the layer 50 is accurately controlled. While a specific method of deposition of the insulating material is described herein, similar boron nitride films may be deposited on heated or unheated substrate conductive members by other processes, such as radio frequency sputtering techniques, using, for example, argon or a mixture of argon and nitrogen or pure nitrogen as a sputtering atmosphere.

After removal of the coated metallic member from the vacuum chamber a portion of the insulating layer is masked in a conventional manner along the region designated 52 in FIG. 2. A layer 54 of an insulating material such as silicon oxide is then formed by conventional techniques on the composite assembly with the exception of the region 52. The top metallic film layer 56 is formed on the assembly of desirably a thickness of 200 angstroms or less and of a substantially high work function material relative to the base metal material to provide a 1 to 2 electron volts differential across the insulator. A suitable material for layer 56 includes gold, platinum, silver, copper, aluminum or other highly conductive materials which are also fairly transparent to hot electrons. It is also desirable to reduce the work function of the top metal film layer facing towards the vacuum by the method of the application of a near monatomic layer 57 of cesium, oxygen cesium, barium or barium oxide to this surface. It will therefore be possible to select a base metal having a low work function, a top metal having a high work function and a reduced vacuum work function on the outer face of the top layer to thereby reduce the required electric field strength to initiate electron emission into the vacuum. An example of the selecting of materials would include a base metal of zirconium having a photoelectric vacuum work function of 3.6 electron volts and a top layer of platinum having a work function of 5.3 electron volts without the cesium.

The metal base member 48 is provided with a contact 58 disposed thereon and is negatively biased by means of variable voltage source 60. The top, illustratively cesium coated metallic film layer 56, 57 is positively biased to initiate electron emission by means of contact 62 providing for interconnection between this layer and voltage source 60. With appropriate voltages applied between the conductive members 56 and 48 the device will operate as a diode and may be suitably adjusted to provide the appropriate tunneling current. An anode 64 may be disposed in the vicinity of the electron emission and an additional voltage source 66 is connected in the circuit to assist in the formation of a stream of electrons indicated by the dotted lines 68. The contacts 58 and 62 may be applied to the respective conductive materials by suitable well known techniques.

Figure 3:
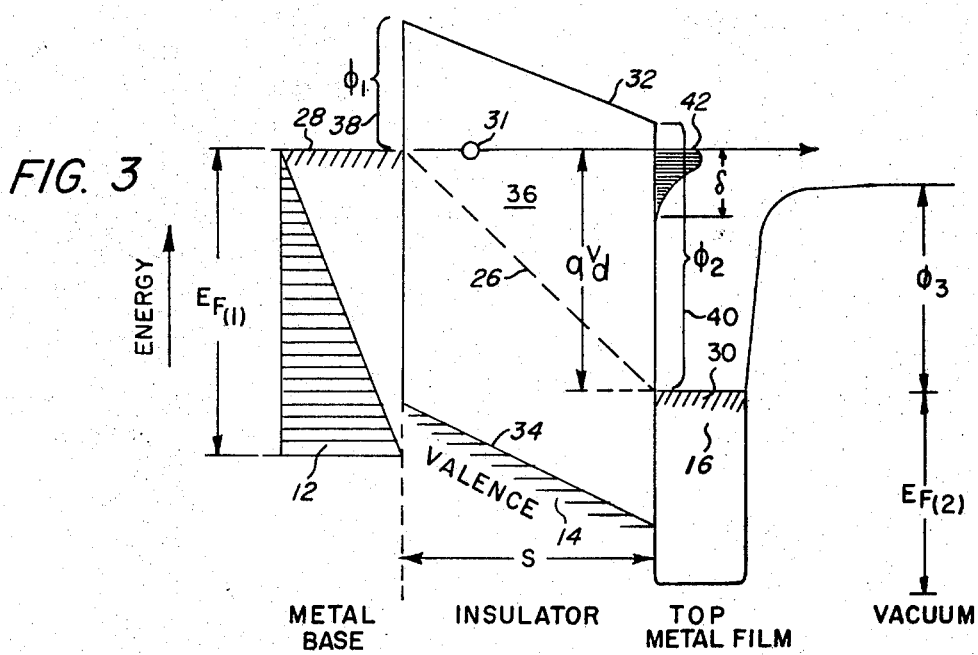
FIG. 3 is an energy level diagram of the embodiment of the invention.

The operation of the tunnel cathode emitter utilizing the principle of reduced field strength as well as the description of the energy level states of the illustrative embodiment of the invention follows with reference being directed to FIG. 3. When an electric field is applied between conductive members 12 and 16 electrons in the metal base member occupy energy levels corresponding to the Fermi level $E_{F(1)}$ and after tunneling in the top metallic film layer the corresponding Fermi level is $E_{F(2)}$. The electron work function of the top metallic film layer is substantially higher relative to the metal base member preferably by an amount near $qV_d$ where $V_d$ is the voltage potential applied between the two conductive members and the symbol $q$ is equivalent to the charge of the electron. The insulator layer is characterized by a valance band 34 and a conduction band 32 separated by a substantially wide forbidden energy band 36. The dotted line 26 joins the Fermi level limit 28 of the metal base member 12 to the upper limit of the Fermi level 30 of the top metal film layer 16. Through the appropriate selection of the insulator material as well as the material and corresponding energy barriers on either side of the insulator layer electrons can tunnel from metal base member 12 to the top metallic film layer 16 substantially entirely through the forbidden band as indicated diagrammatically by the electron designated 31 and be emitted into the vacuum. Electrons which tunnel through this band have significantly higher energies to go over the vacuum barrier than electrons tunneling into the conduction band. As a result, the circulating current in the diode is kept small, providing a longer life and more stable cathode emitter. Those electrons which are not emitted because of losing too much energy from collisions within the insulator or the top conductive member which initially tunneled with too little energy to go over the vacuum barrier will eventually fall below the Fermi level $E_{F(2)}$ and be conducted away through the voltage source.

In the illustration the symbol $\phi$ indicates the barrier height and energy separation between adjacent materials and is customarily expressed in electron volts. $\phi_1$ as indicated by the bracket 38 refers to the work function between the metal base member 12 and the insulator film 14. The symbol $\phi_2$ and bracket 40 represent the barrier height and work function between the insulator material and the top metallic film layer 16. Finally, $\phi_3$ represents the work function of the top metallic film layer 16 oriented toward the vacuum medium adjacent to the tunnel cathode emitter. Usually, in prior art devices the vacuum work function $\phi_3$ is larger than the metal-insulator work function $\phi_2$ and consequently electrons appear in the insulator conduction band and are subject to various elastic as well as inelastic scattering mechanisms. These processes take energy away from many tunneling electrons and eventually prevent their emission over the vacuum barrier. In addition, such mechanisms lead to excessive heating of the tunnel cathode emitter with resultant destructive breakdown. A given tunneling current can be made to flow at a reduced electric field strength if the work function of the top metal film layer $\phi_2$ exhibits a higher value towards the insulator layer than the metal base member value $\phi_1$.

It is suggested in accordance with the present invention that the metal base layer be chosen from a material exhibiting a work function which is smaller than that of the top metal film layer. The contact potential existing between the two conductive layers as discussed by John G. Simmons, Journal of Applied Physics, vol. 35, No. 8, August 1965, pp. 2472–2473, in this configuration counteracts the potential applied to effect emission of electrons as discussed above. As a result, the electric field across the insulator is kept small and consequently its effect on the stability of the isolator is minimized. A work function differential of 1–2 electron volts between the metal base and top metal film layer is preferred. Electron emission is further enhanced by providing a relatively small work function $\phi_3$ of the top metal film layer facing the vacuum which may be produced by depositing barium, cesium, oxygen-cesium or barium oxide coating of optimum thickness on the surface of the top metallic film layer. In most embodiments a layer thickness as near as possible to a monatomic layer will yield the desired results.

A typical shape of the energy distribution of the improved tunnel cathode emitter oriented perpendicular to the surface of the top metal film layer is indicated by the numeral 42. These electrons are considered as the hot or energetic electrons since their energy levels are significantly above the Fermi level $E_{F(2)}$. In order to obtain emission the voltage source across the insulator is larger than $\phi_3/q$. The symbol $\delta$ designates the energy spread of the electrons as they enter the top metal film layer upon the application of the suitable voltage $V_d$ across the tunnel cathode emitter. It may be noted that in the energy band structure shown in FIG. 3 $\delta$ lines up with the interior of the forbidden energy band 36 of the material. The electrons therefore from the metal base member 12 tunnel through this forbidden band to reach the top metallic layer 16.

The foregoing description applies to a tunnel cathode emitter operated in a vacuum at a temperature of near 0° K., but this description is also valid to a good approximation for operation at room temperature. An excellent discussion of applicable structures for the generation of low noise electrons may be had by referring to U.S. Pat. 3,250,920 issued May 10, 1966 to G. Wade and assigned to the assignee of the present invention.

Figure 4:
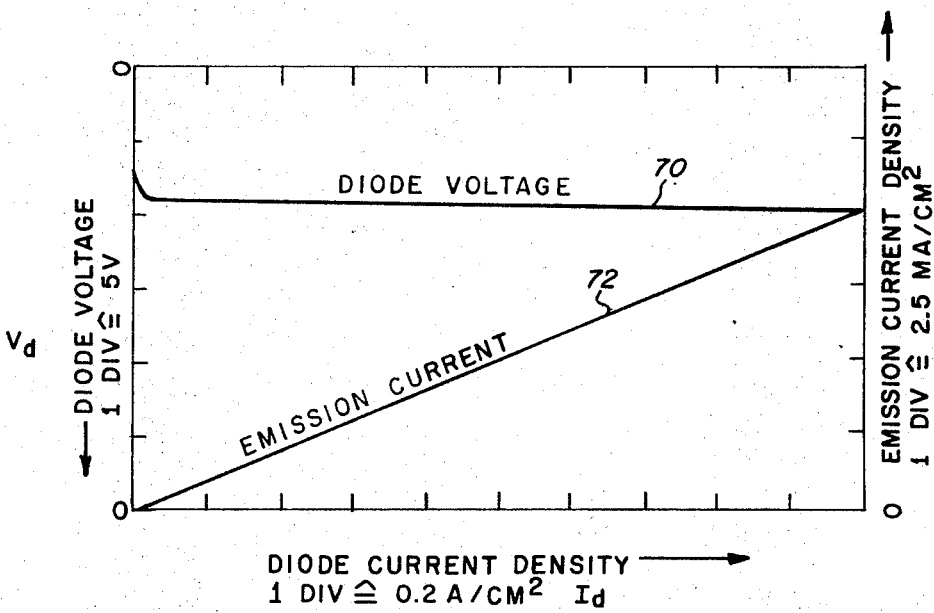
FIG. 4 is a graph of voltage-current characteristics of a tunnel cathode emitter embodiment incorporating the teachings of the present invention.

Referring next to FIG. 4, a plot of the voltage-current characteristics of a working embodiment of the invention is illustrated. In this embodiment the desired layer of boron nitride insulating material was deposited on a ruthenium metal base layer with a gold top metallic film layer. Connection of the voltage supply 60 between the contacts 58 and 62 results in the performance curve 70 of diode voltage. This curve indicates that in the region of zero voltage essentially no current will flow through the device. At a minimum level, however, a significant current will flow as a result of the quantum mechanical tunneling phenomenon. When the anode 64 and voltage supply 66 are coupled into the diode circuit, the emission current characteristics shown on curve 72 will follow. A controlled source of a relatively high density electron beam is now available which may be employed as a solid state cathode emitter for electron discharge vacuum devices.

In the fabrication of embodiments utilizing the teachings of the present invention a plurality of individual devices may be produced with conventional dicing techniques after a relatively large member of a first conductive metallic material is coated with the boron nitride film and the top metallic film layer deposited thereon. In addition, matrices incorporating large quantities of tunnel cathode emitters fabricated in accordance with the invention may be utilized in image tubes providing readout screens for the display of information communicated through electron beams. The invention readily lends itself to the incorporation of conventional integrated circuit techniques due to its thin film configuration.

The medium adjacent the top metallic film layer in addition to a vacuum may comprise N-type semiconductor material such as silicon and germanium as well as other insulating layers to result in an amplifier structure or electroluminescent source according to the well known techniques in the art.

It will further be obvious therefore to those skilled in the art that numerous modifications, alterations or variations may be practiced in the desired configurations herein contained without departing from the spirit of the invention as defined in the appended claims. Accordingly, it is intended that all matter shown and described herein is to be interpreted as illustrative and not in a limiting sense.

What is claimed is:
1. A solid state tunnel cathode emitter comprising:
a base member of a first conductive material;
a thin film insulating layer having a thickness less than 200 angstroms of boron nitride deposited on the surface of said base member;
a layer of a second conductive material deposited on said insulating layer;
said second conductive layer being selected of a material having a higher electron work function relative to said base member material to yield a work function differential in the order of approximately one to two electron volts across said insulating layer;
and means for establishing an electric field potential across said insulating layer whereby electrons tunneling through said layer move substantially entirely through the forbidden energy band region of said insulating material.

2. A solid state tunnel cathode emitter according to claim 1 wherein said first conductive material is selected from the group consisting of zirconium, magnesium, thorium, titanium, and ruthenium.

3. A solid state tunnel cathode emitter according to claim 1 wherein said second conductive layer is selected from the group consisting of gold, platinum, silver, copper and aluminum.

4. A solid state tunnel cathode emitter comprising:
a substrate member of an insulating and refractory material;
a layer of a first conductive material deposited on the surface of said substrate;
a thin film insulating layer having a thickness of less than 200 angstroms of boron nitride deposited on the first conductive layer;
a layer of a second conductive material deposited on said insulating layer;
said first and second conductive layers being selected of materials to provide a higher electron work function of said second layer relative to said first layer and yield a work function differential substantially in the range of one to two electron volts across said insulating layer;
and means for establishing an electric field potential across said insulating layer whereby electrons tunnel through said layer substantially entirely through the forbidden energy band region of said insulating material.

5. A solid state tunnel cathode emitter according to claim 4 wherein said substrate material is selected from the group comprising alumina, fused silica, quartz and N-type silicon semiconductor materials.

6. A solid state tunnel cathode emitter comprising:
a base member of a first conductive material;
a thin film insulating layer having a thickness less than 200 angstroms of boron nitride deposited on the surface of said base member;
a layer of a second conductive material deposited on said insulating layer;
said first and second conductive materials being selected to provide a higher electron work function of said second layer relative to said base member and yield a work function differential of in the order approximately one to two electron volts across said insulating layer;
and a layer of monatomic thickness deposited on the outer surface of said second conductive layer of a material to reduce the electron work function of said outer surface.

7. A solid state tunnel cathode emitter according to claim 6 wherein said monatomic layer is selected from the group consisting of barium, barium oxide, cesium and oxygen cesium.

References Cited
UNITED STATES PATENTS

| | | | |
|---|---|---|---|
| 3,373,051 | 3/1968 | Chu et al. | 117—106 |
| 3,445,281 | 5/1969 | Sullivan | 117—217 |
| 3,447,043 | 5/1969 | Wallace | 317—234 |
| 3,359,466 | 12/1967 | Pollock et al. | 317—234 |
| 3,259,759 | 7/1966 | Giaever | 307—88.5 |
| 3,184,636 | 5/1965 | Dore et al. | 315—94 |
| 3,150,282 | 9/1964 | Geppert | 313—346 |
| 3,184,659 | 5/1965 | Cohen | 317—238 |

JOHN W. HUCKERT, Primary Examiner

M. H. EDLOW, Assistant Examiner

U.S. Cl. X.R.

117—212